United States Patent
Ball

(10) Patent No.: US 10,427,195 B2
(45) Date of Patent: Oct. 1, 2019

(54) CHEMICAL OXIDATION METHOD AND COMPOUNDS

(71) Applicant: OXYTEC LLC, Newton, MA (US)

(72) Inventor: Raymond G. Ball, Newton, MA (US)

(73) Assignee: OXYTEC LLC, Newton, MA (US)

( * ) Notice: Subject to any disclaimer, the term of this patent is extended or adjusted under 35 U.S.C. 154(b) by 0 days.

(21) Appl. No.: 16/183,327

(22) Filed: Nov. 7, 2018

(65) Prior Publication Data

US 2019/0151912 A1    May 23, 2019

Related U.S. Application Data

(63) Continuation of application No. 15/881,589, filed on Jan. 26, 2018, now Pat. No. 10,183,317, which is a continuation of application No. 15/230,947, filed on Aug. 8, 2016, now abandoned, which is a continuation of application No. 14/333,988, filed on Jul. 17, 2014, now Pat. No. 9,409,216, which is a continuation of application No. 13/284,558, filed on Oct. 28, 2011, now abandoned, which is a continuation of application No. 12/464,478, filed on May 12, 2009, now Pat. No. 8,049,056.

(60) Provisional application No. 61/052,447, filed on May 12, 2008.

(51) Int. Cl.
| | | |
|---|---|---|
| *B09C 1/08* | (2006.01) | |
| *C07C 21/18* | (2006.01) | |
| *B09C 1/02* | (2006.01) | |
| *B09C 1/00* | (2006.01) | |
| *C02F 1/72* | (2006.01) | |
| *C02F 1/78* | (2006.01) | |
| *B01J 20/24* | (2006.01) | |
| *C02F 103/06* | (2006.01) | |
| *C02F 101/30* | (2006.01) | |
| *C02F 101/32* | (2006.01) | |
| *C02F 101/36* | (2006.01) | |
| *C02F 101/38* | (2006.01) | |

(52) U.S. Cl.
CPC ............... *B09C 1/08* (2013.01); *B01J 20/24* (2013.01); *B09C 1/002* (2013.01); *B09C 1/02* (2013.01); *C02F 1/72* (2013.01); *C02F 1/725* (2013.01); *C02F 1/78* (2013.01); *B09C 2101/00* (2013.01); *C02F 2101/306* (2013.01); *C02F 2101/322* (2013.01); *C02F 2101/327* (2013.01); *C02F 2101/363* (2013.01); *C02F 2101/366* (2013.01); *C02F 2101/38* (2013.01); *C02F 2103/06* (2013.01)

(58) Field of Classification Search
None
See application file for complete search history.

(56) References Cited

U.S. PATENT DOCUMENTS

| | | | | |
|---|---|---|---|---|
| 5,425,881 A | * | 6/1995 | Szejtli ............... | B09C 1/02 134/25.1 |
| 6,459,011 B1 | * | 10/2002 | Tarr ................. | A62D 3/33 405/128.5 |
| 8,049,056 B2 | | 11/2011 | Ball | |
| 2006/0016763 A1 | * | 1/2006 | Kerfoot .............. | B09C 1/00 210/746 |
| 2008/0008535 A1 | | 1/2008 | Ball | |
| 2008/0073072 A1 | * | 3/2008 | Drucker ............. | B09C 1/005 166/67 |

FOREIGN PATENT DOCUMENTS

| | | |
|---|---|---|
| CN | 1680219 | 10/2005 |
| CN | 101884831 | 11/2010 |
| CN | 103058319 | 4/2013 |
| CN | 105271501 | 1/2016 |
| JP | 2003320366 | * 5/2002 |

OTHER PUBLICATIONS

Robert C. Buck, "Perfluoroalkyl and Polyfluoroalkyl Substances in the Environment: Terminology, Classification, and Origins", Integrated Environmental Assessment and Management, 2011, pp. 513-541, vol. 7, No. 4.
Wilson et al., "19F and 1H NMR Investigation of Cyclodextrin/Fluorocarbon Alkyl Carboxylate Surfactant Inclusion Complexes", Langmuir, 1998, vol. 14, pp. 4710-4717.
Karoyo et al., "Formation of Host-Guest Complexes of R-Cyclodextrin and Perfluorooctanoic Acid", The Journal of Physical Chemistry, 2011, vol. 115, pp. 9511-9527.

* cited by examiner

*Primary Examiner* — Sheng H Davis
(74) *Attorney, Agent, or Firm* — Finch & Maloney PLLC

(57) ABSTRACT

A method and system for the reduction of contamination in soil and groundwater is provided. Cyclic oligosaccharides can be used, for example, to carry oxidants, carry activators, solubilize organic contaminants and promote biodegradation.

20 Claims, 3 Drawing Sheets

CHEMICAL OXIDATION METHOD AND COMPOUNDS

RELATED APPLICATIONS

This application is a continuation of U.S. application Ser. No. 15/881,589, filed on Jan. 26, 2018, which is a continuation of U.S. application Ser. No. 15/230,947, filed on Aug. 8, 2016, which is a continuation of U.S. application Ser. No. 14/333,988, filed Jul. 17, 2014, which is a continuation of U.S. application Ser. No. 13/284,558, filed Oct. 28, 2011, which is a continuation-in-part of U.S. application Ser. No. 12/464,478, filed May 12, 2009, now issued on Nov. 1, 2011 as U.S. Pat. No. 8,049,056, which claims the benefit of U.S. Provisional Patent Application No. 61/052,447, titled "Oxidant Stabilization," filed May 12, 2008. Each of these applications is hereby incorporated by reference herein.

STATEMENT REGARDING FEDERALLY SPONSORED RESEARCH

This invention was made in part with government support under contract FA8903-11-C-8004 awarded by U.S. Air Force Center for Engineering and the Environment on Sep. 16, 2011. The government may have certain rights in the invention.

FIELD OF THE INVENTION

The present invention relates generally to the chemical oxidation of organic contaminants and, in particular, to the stabilizing of ozone for the purpose of destroying organic contaminants.

BACKGROUND

Both State and Federal governments have issued regulations governing hazardous organic and inorganic contaminants in the environment. Subsurface soil and groundwater contamination with organic and inorganic contaminants has been the concern of State and Federal government since the 1970's. Action levels and clean-up standards have been promulgated by both State and Federal government for numerous organic and inorganic contaminants. Regulated organic contaminants in the subsurface environment include, but are not limited to: polychlorinated biphenyls (PCBs); chlorinated volatile organic compounds (CVOCs) such as tetrachloroethene (PCE), trichloroethene (TCE), trichloroethane (TCA), dichloroethene (DCE), vinyl chloride; fuel constituents such as benzene, ethylbenzene, toluene, xylene, methyl tert butyl ether (MTBE), tertiary butyl alcohol (TBA), polynuclear aromatic hydrocarbons (PAHs), ethylene dibromide (EDB); pesticides such as (but not limited to) DDT; herbicides such as (but not limited to) silvex. Regulated inorganic contaminants in the subsurface environment include: heavy metals, such as lead, arsenic, chromium, mercury, and silver. The State and Federal regulations that govern these subsurface contaminants outline a protocol for subsurface investigation to identify the extent of contamination, identification of the human health and ecological risk posed by the contaminants, development of remedial action alternatives for reducing or eliminating any significant risk posed by the contaminants, and selection and implementation of remedial measures to achieve the remediation goals.

In situ (ISCO) and ex situ (ESCO) chemical oxidation technologies have emerged as prominent remedial measures due to cost-effectiveness and timeliness for achieving remediation goals. This technology can be used alone or in combination with other complementary technologies, such as soil vapor extraction (SVE) for removal of volatile organic compounds from the unsaturated zone, multi-phase extract for removal of organic contaminant from the unsaturated and saturated zones, or vertical recirculation systems in the saturated zone. ESCO can be applied by excavating subsurface soil and spraying or mixing chemical oxidants into the soil. ESCO can also be applied to solid surfaces such as vehicles and equipment.

SUMMARY OF THE INVENTION

In one aspect, a method of reducing the concentration of perfluoroalkyl compounds in a contaminated material is provided, the method comprising desorbing at least one of the perfluoroalkyl compounds from the contaminated material, forming a soluble cyclic oligosaccharide/perfluoroalkyl complex in an aqueous phase, and destroying at least one of the perfluoroalkyl compounds and the cyclic oligosaccharide by oxidizing the cyclic oligosaccharide/perfluoroalkyl complex in the aqueous phase, wherein the contaminated material comprises at least one of soil, sediment and rock.

In another embodiment, the cyclic oligosaccharide/perfluoroalkyl complex is destroyed in situ.

In another embodiment, the cyclic oligosaccharide/perfluoroalkyl complex is destroyed ex situ.

In another embodiment, the cyclic oligosaccharide and the perfluoroalkyl compounds are oxidized by at least one of persulfate, ozone, oxygen, and peroxide in situ.

In another embodiment, the cyclic oligosaccharide and the perfluoroalkyl compounds are oxidized by at least one of persulfate, ozone, oxygen, and peroxide ex situ.

In another embodiment, the method includes sparging at least one of ozone, oxygen, air, and nitrogen in the aqueous phase.

In another embodiment, the method includes adding at least one, at least two, at least three, at least four, at least five or at least six of persulfate, ozone, hydrogen peroxide, oxygen, air, nitrogen and a salt.

In another embodiment, the method includes passing bubbles in the aqueous phase and the bubbles may comprise ozone.

In another embodiment, any dissolved cyclic oligosaccharides, dissolved perfluoroalkyl compounds, and solubilized cyclic oligosaccharide/perfluoroalkyl complex are simultaneously destroyed using at least one of persulfate, ozone, oxygen, and peroxide.

In another embodiment, the cyclic oligosaccharide comprises at least one of alpha-cyclodextrin or a derivative thereof; beta-cyclodextrin or a derivative thereof; and gamma-cyclodextrin or a derivative thereof.

In another embodiment, the cyclic oligosaccharide comprises a hydroxypropyl beta cyclodextrin.

In another embodiment, the cyclic oligosaccharide is in a concentration range of greater than 10 mg/L.

In another embodiment, the method includes introducing at least one of an activator, a catalyst, a complexing agent, a surfactant, and a co-solvent to the aqueous phase.

In another embodiment, the contaminated material is in a saturated zone.

The compounds and methods disclosed herein may be used to remediate organic compound contamination in situ or ex situ. They may be used in conjunction with known and future methods that employ various oxidants including, for example, ozone, persulfate, permanganate, percarbonate and peroxide. Activators may also be included. In some cases, the ozone can form a superoxide radical to aid in oxidative processes. Components may be provided (e.g., injected) together or separately. The clathrate host can be recycled and can be recharged with additional ozone.

BRIEF DESCRIPTION OF THE DRAWINGS

The above-mentioned and other features of this disclosure, and the manner of attaining them, will become more apparent and better understood by reference to the following description of embodiments described herein taken in conjunction with the accompanying drawings, wherein.

DETAILED DESCRIPTION

Figure 1:
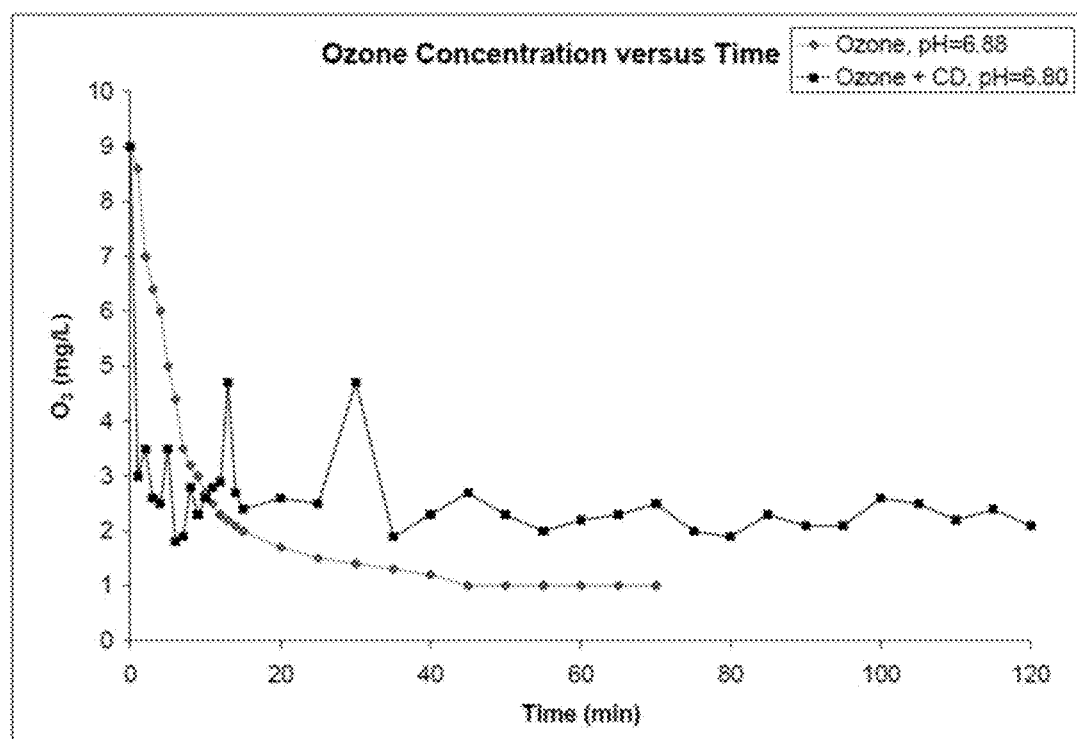
FIG. 1 is a graph showing experimental results of ozone concentration vs. time.

The terms "cyclodextrin" (CD) and "derivitized cyclodextrin" (dCD) are used as they are in the art and include compounds such as alpha, beta, or gamma cyclodextrin and derivatives thereof such as hydroxy-propyl beta cyclodextrin (HP-β-CD), amino-propyl cyclodextrin, carboxymethyl cyclodextrin (CMCD) and randomly methylated beta-cyclodextrin (RAMEB). Cyclodextrin includes derivitized cyclodextrin unless otherwise specified. Cyclodextrins are cyclic oligosaccharides and, more specifically, cyclic oligoglucosides.

The term "microencapsulation" is defined as a method of controlled release whereby a solid, liquid, or gas is packaged in minute sealed capsules that release their contents at controlled rates under the influence of specific conditions. CDs can be considered as empty capsules of molecular size that form complexes with guest molecules resulting in an encapsulation process on the molecular scale.

A "clathrate" or "clathrate compound" is used herein as it is used in the art and means an inclusion complex having a lattice of at least two molecules in which one molecule traps the other. The two molecules are not covalently bonded to each other but are held together by weaker forces such as hydrogen bonds. Clathrates may be referred to as host-guest complexes or inclusion compounds. An example of a clathrate is a complex of ozone retained within the interior cavity of a cyclodextrin molecule. Clathrates are not to be confused with surfactants and need not function as surfactants. An "ozone clathrate" is a clathrate in which the guest is one or more ozone molecules. A "cyclic oligosaccharide clathrate" is a clathrate in which the host is a cyclic oligosaccharide.

Clathrates, such as cyclodextrin clathrates, can microencapsulate ozone in aqueous solution, increasing its solubility and stability. Cyclodextrins are also capable of desorbing organic and inorganic contaminants from, soils, slurries, sediment and other materials. These compounds also are believed to be biodegradable and do not react directly with oxidants used in chemical remediation. Thus, cyclodextrins (and related compounds) can provide a biodegradable vehicle for both stabilizing ozone and desorbing organic contaminants.

An ozone clathrate can be formed, for instance, by injecting ozone into water to produce an aqueous solution (e.g., with a Mazzei injector) and adding a clathrate host component such as an oligosaccharide (e.g., cyclodextrin). Alternatively, the water may contain the cyclodextrin prior to injection of the ozone into the solution. The solution may contain ozone/oligosaccharide clathrate as well as unassociated ozone and unassociated oligosaccharide.

In one aspect, a method of stabilizing ozone to improve the oxidation of organic contaminants is provided. A clathrate consisting of ozone and a cyclic oligosaccharide, such as cyclodextrin, can prolong the in situ or ex situ half life of ozone, attenuate the amount of ozone in solution and provide for an expanded zone of influence at a remediation site. A clathrate including ozone may also be more soluble in water than ozone alone. Thus the clathrate can provide both enhanced stability and enhanced solubility of ozone. Via a clathrate, ozone can be delivered in a hydrophobic phase that is suspended in a hydrophilic phase. When a target contaminant is contacted, the contaminant molecule may be drawn to the oxidant by the clathrate or the oxidant may be delivered to the reactive site by the clathrate. The oxidant, which may be ozone, can be associated with the clathrate, meaning that the ozone is microencapsulated by the clathrate and carried in the aqueous solution and through the zone of contamination as a single ozone clathrate complex. One or more ozone molecules may be associated with a clathrate molecule and one or more cyclodextrins may be associated with an ozone molecule. For instance, an ozone molecule may be retained inside a cyclodextrin molecule. As a result, the ozone molecule is protected from ambient reducing agents and its activity can be prolonged. This may provide a greater zone of influence for a given concentration of oxidant.

A cyclic oligosaccharide is of a generally toroidal shape that can form a clathrate by retaining one or more ozone molecules in the interior cavity of the torus. A host-guest relationship between the cyclic oligosaccharide and the ozone is formed in which the ozone is stabilized via its stearic attraction to the cyclic oligosaccharide. It is believed that as a component of the clathrate, the ozone is protected from reduction by substances that would otherwise contact the ozone molecule in solution. These reducing agents may be numerous in environments such as ground water and soil. The microencapsulated ozone is isolated from these non-target reducing compounds, allowing a greater percentage of the ozone to remain for reaction with target contaminants. For in situ methods, this stabilization effect allows a greater percentage of the compound to be transported in the unsaturated or saturated zone of the subsurface farther away from the injection point, thus providing for a decreased number of vertical or horizontal injection points. It is believed that the cyclodextrin clathrate may also act as a reactor where guest molecules of both contaminant (e.g., organic solvent) and oxidant molecules (e.g., ozone) associate with either the hydrophobic cavity or the hydrophilic hydroxyl groups of the cyclodextrin and come in close contact with each other. This close stearic interaction can promote reaction between the contaminant and the oxidant molecule.

The use of an ozone clathrate (such as ozone/cyclodextrin) can provide for a stable concentration of ozone in the reaction zone. For instance, initial ozone concentration in solution may be significantly lower when compared to the concentration typically realized upon introduction of a conventional ozone solution. This means that less ozone may be destroyed by native reducing agents that are not targets of the remediation. Over time, often a matter of minutes, the ozone concentration may become higher when a clathrate is used because the microencapsulated ozone is protected from reducing agents and is released from the clathrate only when the unassociated ozone concentration drops below a specific concentration, for example, 1 ppm or 2 ppm by weight. This chemical equilibrium between the ozone clathrate and free ozone in solution can provide a consistent concentration of ozone to the reaction zone. In some embodiments, the solubility of the organic or inorganic hydrophobic contaminant may be enhanced by the introduction of a clathrate and the contaminant can be concentrated by the oligosaccharide component of the clathrate. This may also result in more frequent contact between the hydrophobic contaminant and the ozone molecule because the hydrophobic contaminant may exhibit an affinity for the oligosaccharide that is hosting the ozone.

Examples of cyclic oligosaccharides include cyclic oligoglucosides such as α-cyclodextrin, β-cyclodextrin, γ-cyclodextrin and randomly methylated β-cyclodextrin (RAMEB). A clathrate comprising hydroxypropyl β-cyclodextrin (HP-β-CD) in particular has been shown to provide higher and more stable concentrations of ozone in solution when compared to ozone alone. Cyclic oligosaccharides may also be used to form clathrates with other oxidizing, reducing or radical forming compounds useful in chemical and biological remediation. These compounds may include, for example, oxygen, hydrogen, peroxide, persulfate, permanganate or other peroxygen compound. One embodiment includes an ozone/cyclodextrin clathrate, persulfate and hydrogen peroxide. In various embodiments, the persulfate may be either monopersulfate or dipersulfate.

Compounds capable of forming clathrates may be natural or synthetic. Examples of compounds capable of forming natural clathrates include cyclodextrins, carbon nanotubes, ureas, and zeolites. Natural clathrates may be biodegradable and may exhibit low, or no toxicity. Many oligosaccharides are biodegradable in situ. In preferred embodiments the oligosaccharide (e.g., cyclodextrin) is stable for more than a day but degrades in less than a year (half life) in situ. This can provide for efficient delivery of ozone and desorption of target organic compounds while avoiding long term residual injectate contamination, such as can happen with the use of surfactants.

In one aspect, the present invention relates to the treatment of material contaminated with undesirable organic or inorganic compounds that can be destroyed by oxidation. Material includes, for example, soil, sediment, clay, rock, sand, till and the like (hereinafter collectively referred to as "soil"). Additional treatable materials include contaminated water and groundwater found in the pore spaces of soil and rock, process water resulting from various industrial processes or wastewaters (e.g., tar sand waste water). Material also includes, for example, "separate-phase" contaminants such as dense and/or light non-aqueous phase liquids (NAPL). Material can further include a surface contaminated with an undesirable organic or inorganic compound, such as the inside of a pipe through which liquid or solids flow, or the surface of a natural or synthetic fabric. The present invention also relates to a solution for the treatment of suspensions, slurries and solids containing chemical warfare agents. Treatment may proceed in situ or ex situ. Contaminants may be treated in the saturated zone, the unsaturated zone or the smear zone. The use of the clathrate can improve flow rates through the unsaturated zone without sacrificing hydraulic conductivity that can result from the use of surfactants and other materials designed to release contaminant from the material. A clathrate may also improve results when used with a sparging system. For example, the clathrate may enhance the solubility of oxygen, ozone or air in a sparging system, resulting in a greater concentration of reactants in the reaction zone.

ISCO and ESCO technologies can use strong oxidizing agents to treat contaminated soil by chemically degrading recalcitrant and hazardous chemicals. Such oxidizers include, for example, hydrogen peroxide, Fenton's reagent, ozone, permanganate, percarbonate, activated and unactivated persulfates, and other peroxygens. One key aspect to the ability of an oxidizer to function is its ability to permeate through the subsurface either above the groundwater table (unsaturated zone) or below the groundwater table (saturated zone) while interacting with target compounds throughout the entire zone of contamination. Oxidizing species, such as ozone and peroxides have relatively short life times within the subsurface ranging from minutes with ozone to hours with peroxides. Persulfates can survive for greater periods, typically reported in days. In general, there is a desire to have longer lived active species available for organic species decomposition in order to increase the zone of reaction while minimizing the number of injection points throughout the area of subsurface contamination.

ISCO technology can be used alone or in combination with other complementary technologies, such as soil vapor extraction (SVE) for removal of volatile organic compounds from the unsaturated zone, multi-phase extraction for removal of organic contaminants from the saturated zone, vertical or horizontal recirculation systems in the saturated zone, or air sparging of the saturated zone. Both ISCO and ESCO technologies can be combined with different methods of heat application such as radio frequency heating or steam injection for treatment of soil, water, and sediment. Also, they can be combined with bioremediation for enhanced post oxidation treatment.

Various methods of ISCO delivery have been developed for different situations and conditions to improve contact between the contaminant and oxidant. ISCO has been applied to soil and groundwater treatment for the last decade and the demand for this technology continues to grow and evolve.

ESCO can be applied to soil by several methods including a backhoe, excavator, soil mixing auger, mixing jet, windrow mixer or excavation and placement into a reactor vessel. ESCO can be applied to sediment by dredging and mixing in a reactor vessel. ESCO can also be applied to solid surfaces such as vehicles and equipment by spraying as described in U.S. Pat. No. 6,459,011, which is hereby incorporated by reference herein.

Certain contaminants at concentrations greater than their aqueous solubility limit exist as non-aqueous phase liquids (NAPLs) in soil, water or sediment. When in water or an aqueous environment, it becomes important whether the NAPL has a density lighter than water or greater than water. If less dense than water (LNAPLs), the contaminants will float and if more dense than water (DNAPLs), they will sink. Examples of LNAPLs are petroleum hydrocarbons such as gasoline, diesel fuel, and fuel oils. Examples of DNAPLs are various chlorinated organic compounds such as tetrachlorethene (PCE), trichloroethene (TCE), polychlorinated biphenyls (PCB) or manufactured gas plant (MGP) wastes. Chemicals associated with MGP waste include volatile organic compounds (VOCs) like benzene and toluene, polynuclear aromatic hydrocarbons (PAHs) like pyrene, tar acids like phenol and cresol, creosote, and coal tar pitch.

Ozone can be applied to the unsaturated zone, the saturated zone, and/or the smear zone. Ozone can be applied to the unsaturated zone using, for example, vent wells for ozone injection and/or SVE technology whereby a vacuum is induced in the subsurface to distribute the ozone through the area of contamination. Ozone can also be applied to the saturated zone using sparging techniques whereby ozone is added with air or pure oxygen and sparged into the groundwater. Ozone is highly reactive and short lived in the aqueous environment in which soil treatment typically occurs. This limits the radius of influence from either a vertical or horizontal injection point. Ozone can react with a great number of contaminants in a variety of ways including: 1) direct reaction of ozone with organic compounds, and 2) reaction by free hydroxyl radicals. The solubility of ozone in aqueous solution is about 14 mM at 20 degrees C.

There are many factors, such as pH, pressure, temperature, and ionic strength, which can affect the stability of aqueous ozone. The stability of an ozone solution is highly dependent on pH and decreases as alkalinity increases. A higher temperature aqueous solution yields faster ozone depletion. Also, higher ionic strength typically accelerates depletion. Ozone solution stabilization can be considered as either short-term (less than one minute) or long-term (greater than one minute). Short-term aqueous ozone stabilization can be practically achieved by lowering the pH, decreasing the temperature, involving an inhibitor such as an OH radical scavenger, or lowering the ionic strength of solution. Buffer agents such as phosphates are not inert to ozone. Long term ozone stabilization may be achieved by forming a clathrate with a cyclic oligosaccharide.

Cyclic oligosaccharides may be torus shaped with a hydrophobic interior and hydrophilic exterior. The interior of the torus may be relatively nonpolar compared to water. In the case of cyclodextrin, the interior cavity dimension increases with alpha, beta, and gamma cyclodextrin and derivatives thereof. Clathrates of cyclic oligosaccharides are not static species. Substrates included in the cavity rapidly exchange with free substrate molecules in solution. The association of the host and guest molecules and the disassociation of the formed clathrate is governed by a thermodynamic equilibrium:

Cyclic Oligosaccharide+Substrate====Cyclic Oligosaccharide*Substrate

Dissociation Constant for 1:1 molar ratio cyclic oligosaccharide to guest substrate is:

$K_{D\ 1:1}$=[Cyclic Oligosaccharide*Substrate]/[Cyclic Oligosaccharide][Substrate]

This is the most common case; however, 2:1, 1:2, 2:2 or even more complicated associations may exist simultaneously. With increasing temperature the solubility of cyclic oligosaccharides typically increases, but the complex stability may decrease.

In many embodiments, the cyclic oligosaccharide is water soluble and may be, for instance, soluble in an aqueous solution (at neutral pH and a temperature of 25° C.) at a concentration of greater than 10 mM, greater than 20 mM, greater than 50 mM, greater than 100 mM or greater than 500 mM. Preferred oligosaccharides may have molecular weights in the range of, for example, 500 to 5000, 500 to 2000, 500 to 1500, 700 to 1400, 800 to 1200 or 900 to 1100. The cyclic oligosaccharides may comprise an appropriate number of saccharide units including, for example, 4, 5, 6, 7, 8, 9, 10, 11 and/or 12 saccharide units. The oligosaccharide may be naturally occurring or may be synthetic. Preferred cyclic oligosaccharides may include cyclic oligoglucosides such as cylcodextrins (CD). Cyclodextrins include, for example, α-cyclodextrin, β-cyclodextrin and γ-cyclodextrin as well as derivatives thereof. Derivatives of β-cyclodextrin includes, for example, those derivatives structured to improve aqueous solubility, such as hydroxypropyl β-cyclodextrin.

In some embodiments, cyclic oligosaccharides may form clathrates with ozone at molar ratios in the range of 5:1, 2:1, 1:1, 1:2, 1:3, 1:4, or greater. A single aqueous solution may include different clathrates that exhibit different molar ratios of cyclic oligosaccharides and ozone. In some embodiments the clathrate solution may also contain unassociated ozone and/or unassociated cyclic oligosaccharide. To activate the ozone to participate in chemical oxidation, the ozone can be released from the clathrate. In one set of embodiments the release can be facilitated by, for example, altering pressure, altering temperature and/or reducing the pH of the solution. For instance the pH of the solution may be reduced by half a pH unit, from 7.0 to 6.5, to provide for the release of ozone from the clathrate. This pH reduction may be accomplished in one embodiment by the in situ decomposition of persulfate. As pH drops, the activity of ozone increases. This increase in activity results in a reduction in the amount of free ozone available and the drop in ozone concentration pulls free ozone from the clathrate due to the equilibrium relationship between the ozone clathrate and free ozone in solution.

Ozone clathrates may be formed in situ or ex situ. Clathrate solutions may be injected directly into the saturated zone, unsaturated zone and/or smear zone or, in other embodiments, the ozone and cyclic oligosaccharide may form a clathrate after entering the saturated zone, unsaturated zone and/or smear zone. For instance, the cyclic oligosaccharide may be introduced into the saturated zone sequentially with the ozone. The two components can subsequently associate in situ to form the clathrate. In some embodiments it may be preferred to prepare the clathrate solution prior to injecting the components into the ground. This may help reduce the premature and wasteful decomposition of ozone and may reduce side reactions such as oxidation of naturally occurring materials in the soil and/or groundwater. Cyclic oligosaccharides have limited reactivity with soil and thus should not interfere with desired reaction paths. They also do not react with ozone and do not scavenge hydroxyl radicals, leaving them available for organic contaminant destruction. Cyclodextrin can be biodegradable in soil. Cyclodextrin does not interact or adsorb to soil as surfactants do, which, in the case of surfactants, may contribute to the organic carbon load in the soil.

The ozone clathrates may be used in conjunction with other oxidation systems to destroy organic contaminants. Additional useful oxidants may include, for example, any combination of peroxide, persulfate, permanganate, percarbonate and unassociated (non-clathrate) ozone. These additional oxidants may be provided simultaneously with the ozone clathrate and may be introduced via a common aqueous solution or through separate means, such as separate injectors. Additional oxidants may also be provided to the contaminated material prior to or after delivery of the ozone clathrate. For instance, a groundwater site can first be treated with an ozone clathrate, then with unassociated ozone and finally with a combination of persulfate and hydrogen peroxide. Unassociated clathrate host (e.g., cyclodextrin) may also be provided to the contaminated material to facilitate desorption of contaminants.

A remediation system featuring a clathrate may be operated at or close to ambient temperature which can help reduce the volatilization of contaminants. For example, either in situ or ex situ, the clathrate solution can be maintained at a temperature of less than 60° C., less than 50° C., less than 40° C. or less than 30° C.

In general, soil treatment for hydrophobic organic contaminants benefits from a two step mechanism involving both desorption from the solid phase to the aqueous phase followed by flushing and/or either chemical or biological oxidation. To enhance flushing, surfactants can be circulated in an aqueous solution so as to desorb hydrophobic organic contaminants from soil into the aqueous phase. Surfactants function by reducing the interfacial tension at the solid-liquid interphase to desorb organic contaminants from soil. When surfactants and chemical or biological oxidation is used, there are two primary mechanisms that typically occur: 1) adsorbed soil contaminants are first desorbed and then oxidized in the aqueous phase, or 2) sorbed contaminants are directly oxidized while sorbed to the soil and also oxidized in the aqueous phase. For strongly sorbed hydrophobic organic contaminants, the desorption step may be the rate-limiting step in the destruction of the contaminant.

An ozone clathrate may stabilize ozone and may also provide a vehicle for desorbing organic contaminants from a solid phase such as soil or sediment. Clathrates are not surfactants or co-solvents but can exhibit a similar ability to desorb organic compounds from the soil or sediment. When compared to surfactants or co-solvents, clathrates may exhibit properties that make them preferable to surfactants. For example, many clathrates are less likely to form emulsions, can enhance bioremediation by solubilizing the contaminant, can simultaneously desorb organics, are typically biodegradable and are less likely to mobilize LNAPL or DNAPL, which can make remediation much more difficult. Unlike surfactants, clathrates may have little or no effect on interfacial tension while still being useful to remediate NAPL via microencapsulation. As shown below in Experiment 2, in at least some cases, clathrates do not add to oxidant demand. In addition, clathrates typically do not result in soil sorption or pore exclusion as surfactants have been found to do. Furthermore, clathrates do not seem to be adversely affected by changes in pH or ionic strength.

In one set of embodiments an ozone clathrate may be used to control the rate of oxidation. This rate can be adjusted in response to a change in the rate of desorption from the material containing the contaminants of interest. For instance, if the rate of contaminant desorption is low, the rate of ozone release from the clathrate can be reduced so the ozone is kept in reserve until oxidizable contaminants become stearically available. This can be accomplished, for example, by increasing the pH of the solution and can reduce the amount of ozone that would otherwise be scavenged by various reducing agents that are not the target contaminant. If the rate of desorption is high, the rate of release of ozone from the clathrate can be increased, by lower pH for example, to maximize the rate of reaction with the contaminant. Thus, the system can be tuned to maximize the rate of destruction while minimizing the amount of ozone required to do so when compared to requirements for treatment with unassociated ozone. These rates may also be controlled by, for example, changing the clathrate host, altering the concentration of clathrate provided, altering the ozone:oligosaccharide ratio, altering flow rates of the clathrate solution, altering the ratio of clathrate:oxidizer, and/or changing the temperature of the system. In some cases, a combination of different ozone clathrates may be used.

In some embodiments, activators can be added to improve the rate of reaction of the remediation process. An activator is a chemical or condition (e.g., temperature) that can be added or altered to improve the rate of destruction. Activators can include catalysts and changes to the environment, such as the application of heat. Appropriate activators for oxidation systems may be, for example, heat, an increase in pH, a transition metal such as ferrous, ferric, or zero valent iron, hydrogen peroxide, and/or a hydroxyl radical. Zero valent iron may also be used alone without an oxidant to dehalogenate certain halogenated compounds such as chlorinated organic compounds.

Other reagents may be used in conjunction with the clathrate. For instance, complexing agents such as sodium citrate, EDTA, sodium oxalate and tetrasodium pyrophosphate can be added to further enhance desorption and oxidation of PAH and other compounds. This may be particularly useful when heavy metals are present in the matrix. Other compounds such as surfactants and co-solvents may be used to aid in the desorption of contaminants from various matrices. These compounds may be biodegradable surfactants or biodegradable co-solvents. These include, for example, citrus terpenes such as d-limonene.

The type of oligosaccharide that is chosen may also be useful in controlling reaction rates. For instance, certain structures and functional groups may retain ozone more securely than others. The ability of a specific oligosaccharide to host ozone can be determined by one of skill in the art by repeating experiment 1 (described below) with the specific oligosaccharide being evaluated.

In another set of embodiments, the density and/or viscosity of clathrate solution may be controlled to improve contact with the contaminant(s). The viscosity of the clathrate solution can be preselected in order to achieve enhanced contaminant contact/reaction efficiencies. For instance, higher viscosity solutions may be chosen when high porosity soils are encountered. Likewise, low viscosities may be preferred when soil porosities are low. Viscosities may be adjusted by, for example, adjusting the clathrate concentration or the ratio of clathrate to unassociated cyclodextrin (or other oligosaccharide). For those target contaminants that have a density greater than water (DNAPL), the solution can be formulated to have a density greater (e.g., >1.0 g/cm$^3$) than water so as to deliver the most clathrate—oxidant directly to the contaminant. The clathrate solution may have a lower density (e.g., <1.0 g/cm$^3$) for those target contaminants that have a density less than water (LNAPL). A lower density may be achieved by, for example, adding an acceptable co-solvent that renders the density of the solution less than 1.0 g/cm$^3$. Alternatively, a gas may be introduced to the solution to increase buoyancy which can improve contact with LNAPL. One method of controlling the density of the clathrate solution is to increase or decrease the concentration of the clathrate to increase or decrease the density of the solution.

In another embodiment, the clathrate may be used to generate a superoxide radical (anion) such as $O_2$r. Superoxide radicals may be useful in oxidizing many organic contaminants. Examples of how a superoxide radical can be formed are provided below. The concentration of superoxide radicals can be increased by using the ozone clathrate to provide a continuously high level of ozone to the solution. OHr=hydroxyl radical, $HO_2$r=perhydroxyl radical, $O_2$r=superoxide radical.

1) $O_3+H^+ \rightarrow OHr+O_2$ (water reaction)
2) $O_3+OH^- \rightarrow HO_2r+O_2$ (water reaction)
3) $O_3+H_2O_2 \rightarrow HO_2r+OHr+O_2$ (hydrogen peroxide reaction)
4) $O_3+OHr \rightarrow HO_2r+O_2$ (chain reactions from all of the above (1,2,3))
5) $O_3+HO_2r \rightarrow O_2r+OHr+O_2$ (chain reactions from all of the above (1,2,3))
In addition,
6) $H_2O_2+OHr \rightarrow H_2O+O_2r$ (reaction between hydrogen peroxide and hydroxyl radical)
7) $H_2O_2+SO_4r \rightarrow SO_4^{2-}+HO_2r+H^+$ (reaction between hydrogen peroxide and sulfate radical) and;
8) $HO_2r < \rightarrow O_2r+H^+$ (superoxide radical is deprotonated form of perhydroxyl radical and is dependent on the pH of the solution)

Ozone clathrates may be useful in the destruction of a number of contaminants, both organic and inorganic. These contaminants can include, for example, solvents, heavy metals, pesticides, herbicides, fungicides, preservatives, wood preservatives, munitions, explosives, chemical warfare agents, fuels, oils, greases, pharmacologicals, endocrine disruptors (EDC) and viral and/or microbial agents. Classes of organic compounds that can be treated include both dense and light non-aqueous phase liquids (NAPL), dissolved or sorbed organic compounds, volatile organics, semi-volatile organics, chlorinated volatile organics, non-volatile organics, halogenated organics and heavy metals. Specific compounds that can be remediated include, for example, polychlorinated biphenyls (PCBs); tetrachloroethylene (PCE), trichloroethylene (TCE), trichloroethane (TCA), dichloroethene (DCE), chlorophenols, vinyl chloride; fuel constituents such as benzene, ethylbenzene, toluene, xylene, methyl tert butyl ether (MTBE), tertiary butyl alcohol (TBA), polynuclear aromatic hydrocarbons (PAHs), dioxins, furans, ethylene dibromide (EDB); DDT, silvex and geosimin. Inorganic contaminants may include metals, such as lead, arsenic, chromium, mercury, silver, cadmium, nickel and/or cobalt. The use of an ozone clathrate can reduce target contaminant concentrations by more than 50%, more than 75%, more than 90%, more than 95%, more than 98% or more than 99%, by weight. In different embodiments, absolute levels of contaminants can be reduced to less than 1%, less than 1,000 ppm, less than 100 ppm, less than 10 ppm, less than 1 ppm, less than 100 ppb or less than 10 ppb, by weight.

The method described in US Patent Publication No. US2008/0008535A1 to Ball, and which is hereby incorporated by reference herein, can be used to apply a clathrate solution to a remediation site. The technology described herein may also be useful when applied to other remediation methods. Examples of other methods include gravity feed, caissons, trenches, injection and/or extraction wells, recirculation wells (vertical or horizontal), push-pull injection/extraction or reactive walls. Examples of in situ sediment remediation methods include harrows, in situ ozonators and reactive caps. Examples of ex situ methods for soil, water, or sediment include many types of batch, semi-batch, plug flow, slurry-phase reactors, or pressure-assisted reactors.

The ozone clathrate may be provided over a broad range of concentrations. Many clathrate forming compounds, such as cyclic oligosaccharides, are highly soluble in aqueous solutions. For instance, cyclodextrin can be provided at concentrations of greater than 0.1 mg/L, greater than 1 mg/L, greater than 10 mg/L, greater than 100 mg/L, greater than 1000 mg/L, greater than 5 g/L, greater than 10 g/L, greater than 100 g/L, or greater than 200 g/L. Clathrate concentrations may be similar. A saturated ozone solution used in the field is typically at a concentration of about 10 mg/L. By microencapsulating ozone in a clathrate, the ozone concentration can be significantly increased, to greater than 20 mg/L, greater than 50 mg/L, or greater than 100 mg/L, or greater than 500 mg/L. In addition, the oligosaccharide portion of the clathrate can be re-charged with ozone after the ozone has been released from the clathrate into solution. This re-charging may take place above ground or in situ.

A clathrate solution may be used ex situ or in situ and may be provided at a rate appropriate for controlled destruction of the target contaminants. Injection rates may also be controlled in response to depth, soil conditions, permeability, number of injectors and previous treatment. In some embodiments, the clathrate solution can be provided (e.g., injected) at a rate of 1 L/min, 5 L/min, 10 L/min, 50 L/min, 100 L/min or more.

The following provides an example of how a clathrate solution may be used with the system provided in U.S. Patent Publication No. US2008/0008535A1. Initially, a super-saturated ozone in water solution is mixed with a cyclic oligosaccharide using, for instance, an in-line static mixer, a venturi, a porous metal sieve/diffuser or a pressure vessel or combinations thereof and injected into the subsurface at a specified flow rate and for a specified time selected based on the conditions at the site. Hydrogen peroxide (which may be buffered) and buffered persulfate may be either simultaneously or sequentially injected into the subsurface. The same or different injection wells may be used for the different components. The chemical oxidation process may be monitored by taking measurements of, for example, pH, ORP, conductivity, temperature, dissolved oxygen, dissolved ozone, hydrogen peroxide, persulfate, sulfate and phosphate. If monitoring indicates that contaminants remain after several weeks, the procedure may be repeated using the same or different injection wells.

In another embodiment a solution of ozone and a solution of a cyclic oligosaccharide may be introduced independently to the saturated zone, unsaturated zone or smear zone. For instance, a cyclodextrin solution may be injected into the ground simultaneously or sequentially (before or after) with a solution or supersaturated solution of ozone. Upon mixing, the clathrate may be formed in situ.

In another embodiment, a clathrate solution may be produced by adding solid cyclic oligosaccharide to an ozone solution. For instance, powdered hydroxypropyl beta cyclodextrin may be added to a supersaturated ozone solution at atmospheric pressure. In this manner, foaming that might occur by bubbling ozone through a cyclic oligosaccharide solution can be avoided while still achieving high clathrate concentrations.

In another set of embodiments a cyclic oligosaccharide can be used to remediate soil, sediment, surfaces, and water samples with or without ozone. Cyclodextrin is exemplary of these cyclic oligosaccharides and may be preferred, although other cyclic oligosaccharides can be equally useful.

It has been found that cyclic oligosaccharides such as cyclodextrin can perform a variety of functions in a remediation project. Cyclic oligosaccharides can act as a carrier for oxidants and/or activators. They can solubilize a wide range of organic contaminants such as flame retardants including polybrominated diphenyl ethers (PBDE), perfluoroalkyl compounds; hydrocarbon based fuels (gasoline, diesel, #2, #4 and #6 fuel oils, jet fuel, kerosene), halogenated organics, MTBE, ethylene dibromide, pesticides, herbicides, PCBs, dioxins, furans, endocrine disruptors, and polycyclic hydrocarbons as well as non-aqueous phase liquids (NAPLs) either dense (DNAPL) or light (LNAPL). Cyclic oligosaccharides can also serve as an energy source for bioremediation and can promote biological activity as a co-metabolite that can further remediate contaminated soil or water. Thus, in a single process, cyclic oligosaccharide can deliver an oxidant or activator, solubilize an organic contaminant and promote biological remediation. These different functions can be controlled by regulating the ratios of cyclic oligosaccharide, oxidant and contaminants. Contaminant concentration at a site can be estimated using methods known to those of skill in the art. Oxidant concentrations can be determined by knowing the efficiency of the oxidation system for a target contaminant. The amount of cyclic oligosaccharide can be determined once the practitioner decides what oxidants and/or activators are to be delivered to a site and the amount of residual cyclic oligosaccharide that is desired. Ratios of cyclic oligosaccharide to oxidant to contaminant (on a molar basis) may preferably range from 1000:1000:1 to 1:1:1 to 1:1000:1000. In some cases, the amount of oxidant can be increased to achieve greater levels of destruction. For instance, the amount of oxidant to contaminant may be 2:1, 5:1 or 10:1. Oxidant type and concentrations may also be chosen to provide an environment that promotes microbial activity. Materials such as phosphates may also be included and can provide a nutrient source for microbes as well as a pH buffer. pH may be controlled between 5 and 10 or 6 and 9 to promote microbial activity. Other nutrients such as nitrogen and trace minerals can be added to promote biodegradation. Examples of a nitrogen source include ammonium persulfate and nitrous oxide gas.

Specific cyclic oligosaccharides can be chosen to form a clathrate with a specific guest molecule. For example, a chosen cyclic oligosaccharide may include a large cavity for forming a clathrate with a large activator, oxidant or contaminant. Preferred oligosaccharides can be found and selected using the following technique. First, a solution of candidate cyclic oligosaccharide compound(s) is formed and a stoichiometric amount of the target activator, oxidant or contaminant compound is added. The solution is mixed well and the pH is controlled to promote clathrate formation. Effective formation of a clathrate can be determined using spectrometric techniques or by nuclear magnetic resonance (NMR) to determine how much free compound is unassociated with the oligosaccharide.

An oligosaccharide such as cyclodextrin can be delivered to the site of contamination by injecting an aqueous solution of the compound through a bore hole into the saturated, unsaturated or smear zone. It may be mixed with an oxidant stream such as ozone, persulfate or peroxide, percarbonate, permanganate, perphosphates or may be delivered independently. The oligosaccharide may be delivered before or after administration of the oxidant(s). A gas may be used to aid in dispersing the oligosaccharide and can help to mix the oligosaccharide with the groundwater media. The gas may be introduced with, or separately from, the oligosaccharide. Appropriate gases include air, oxygen, ozone, nitrogen, and nitrous oxide. The oligosaccharide may be delivered at a variety of pHs, including 3.0 to 11.0, 5.0 to 9.0 and 6.0 to 8.0. The solution may be buffered, for example, by a phosphate solution such as sodium phosphate. Phosphate can also aid in precipitating metals in situ and may be added in quantities greater than that necessary for proper pH control. Phosphates can also be used to promote microbial activity for biodegradation.

Cyclic oligosaccharides may be used in conjunction with one or more chemical oxidants that can be used in soil, sediment, surfaces, water and groundwater remediation. For instance, cyclic oligosaccharides may be used with peroxide, persulfate, permanganate, percarbonate, ozone, perphosphates or any combination thereof. In different cases, cyclic oligosaccharides may or may not form a clathrate with the oxidant. For example, ozone may form a clathrate while permanganate does not. Cyclic oligosaccharides may also be used in combination with activators such as organic or inorganic activators. Activators are materials that are not oxidizers themselves but instead promote the oxidation of organic contaminants with other oxidizers such as peroxide, persulfate, permanganate, percarbonate and ozone. Inorganic activators include iron (ferrous, ferricor, and zero valent) and in general, divalent or trivalent transition metals. Ozone can also act as an activator. A clathrate can also be formed using native iron that is present in situ. Activators may be released from the clathrate by, for example, adjusting the pH of the solution. For instance, iron can be released from a cyclic oligosaccharide clathrate by lowering the pH of the solution below pH 5.0 or raising the pH above pH 9.0.

A cyclic oligosaccharide can be used to deliver an oxidant or activator in an aqueous carrier either in situ or ex situ. An activator or oxidant can be added to an aqueous solution of a cyclic oligosaccharide and the activator or oxidant may form a clathrate with the oxidant or activator. This may, for example, improve solubility and stability of the oxidant or activator. For instance, an inorganic activator such as iron can form a clathrate with a cyclic oligosaccharide and can then be delivered to the saturated, unsaturated or smear zones. The clathrate may then release the activator or oxidant resulting in free activator or oxidant and either free cyclic oligosaccharide or a decomposition product thereof. The cyclic oligosaccharide may allow the activator or oxidant to be carried further into the hydrophobic region of the site than would be possible in the absence of the cyclic oligosaccharide.

Cyclic oligosaccharides such as cyclodextrin can solubilize organic contaminants that may be present on a surface or in the water, soil, sediment or groundwater. The organic contaminants may be adsorbed on, or retained by, sand, rock, clay and/or organic material that is present at the contaminated site. Cyclic oligosaccharides typically act unlike surfactants in that the cyclic oligosaccharides do not form micelles and do not have a polar head and hydrophobic tail. Cyclic oligosaccharides such as cyclodextrin have a hydrophobic inner cavity and a hydrophilic exterior wall. Therefore, while it has been found that cyclic oligosaccharides can help solubilize organic contaminants in situ and ex situ, this is typically done in the absence of micelle formation. Nonetheless, cyclic oligosaccharides have been found to be effective at associating with organic contaminants and releasing them from soil, sediment, DNAPL and LNAPL phases into the aqueous phase where they can be destroyed by oxidants in aqueous solution. Cyclic oligosaccharides can act as carriers for oxidants and activators while surfactants are typically not capable of this and are limited to aiding in the solubilization of contaminants.

Surfactants may be biodegradable or may be stable over the long term. They may also be destroyed by the oxidants being used or may be stable in the presence of these oxidants. In one set of embodiments, a cyclic oligosaccharide can be used in conjunction with an anionic surfactant based on sulfate, sulfonate, or carboxylate anions. These include surfactants such as sodium dodecyl sulfate (SDS); or nonionic surfactant based on alkyl polyethylene oxide and its copolymers, alkyl polyglucosides, fatty alcohols, cocamide MEA, and such as the polysorbates, Tween 20 or Tween 80; or anionic/nonionic mixtures such as Simple Green® manufactured by Sunshine Makers, Inc. Other surfactants that can be used include: Alfoterra®, brand of branched alcohol propoxylate sulfate, sodium salt anionic surfactants manufactured by Sasol North America; Citrus Burst #1, #2, and #3 and EZMulse® brand of citrus based surfactants manufactured by Florida Chemical Company. The cyclic oligosaccharide and the surfactant may act in a complementary manner by solubilizing different compounds or by solubilizing the same compound at different rates. When compared to surfactants, the cyclic oligosaccharide may also be more effective at desorbing organic contaminants from specific materials. Vegetable oils, fatty acids, fatty acid methyl esters, from sources such as soy oil, sunflower oil, or canola oil can also be used as a co-solvent in conjunction with cyclic oligosaccharides and surfactants to aid in desorption. Citrus derived oils such as d-limonene can also be used as a co-solvent. Chelating agents such as citric acid, acetic acid, EDTA, phosphonates can be added to assist in transporting activators or to bind natural metals. The addition of heat or hot water can also be used to improve the desorption and biodegradation aspects of the process.

Remediation of contaminated materials through the use of chemical oxidation can be followed by bioremediation. Bioremediation may commence spontaneously after chemical oxidation procedures but often may need to be primed by inoculating with bacteria and/or nutrients. Cyclodextrin and other cyclic oligosaccharides can serve as a energy source for co-metabolism by bacteria but the compounds are typically stable and require significant time in situ before bacteria are able to digest and utilize the polysaccharides. However, by partially oxidizing the oligosaccharide with a chemical oxidant such as persulfate or peroxide, for example, the structure of the oligosaccharide is partially decomposed and the resulting fragments of the oligosaccharide can provide an immediate energy source to any bacteria that may be present. These fragments may include, for example, mono, di and trisaccharides. The site may also be inoculated with bacteria to accelerate biological activity. The presence of cyclic oligosaccharide fragments can provide an immediate boost to the biological activity that results in faster and more complete bioremediation that can occur subsequent to or during chemical oxidation processes. The biological activity may have long lasting residual effects that provide for remediation down to very low contaminant levels after completion of chemical oxidation. Furthermore, the bioremediation can help to destroy additional organic contaminants that may migrate to the site after completion of the chemical remediation process.

In one example, a remediation process may proceed as described below. A site may be contaminated with a variety of poly aromatic hydrocarbons (PAH) present in the saturated and unsaturated zones. The site may include a DNAPL layer. Several wells are drilled at the site providing access to the saturated zone. Aqueous solutions of oxidants such as peroxide, persulfate and ozone may be injected into the saturated zone. Concurrently, a solution of a cyclodextrin/iron clathrate is provided either together with one of the oxidants or as a separate stream. A mixing gas may also be injected such as through a sparger. After being injected into the saturated zone, the iron leaves the clathrate and serves as an activator to promote the oxidation of organic materials present in the saturated zone. The cyclodextrin, now free of the iron, migrates through portions of the saturated or smear zones and solubilizes hydrocarbons that are adsorbed on the surrounding soil, sediment, and rock. The solubilized hydrocarbons are now associated with the cyclodextrin, drawn into the aqueous phase, and are subjected to oxidation from the oxidant or combination of oxidants that may be present.

During the oxidation process, the organic contaminant is mineralized and the cyclodextrin is fragmented. These fragments can then metabolized by native or inoculated bacteria which use the cyclodextrin fragments as an energy source to increase the size and activity of the bacterial colony. These bacteria may then proceed with metabolizing any remaining organic contaminants or portions of organic contaminants that are present. The bacteria may remain in situ for months or years and can reduce the concentration of organic contaminants that enter the area by transport from adjacent areas or via desorption from existing materials.

In a single operation involving desorption, chemical oxidation, and bio-oxidation, any dissolved organic contaminant, organic contaminant/cyclodextrin complex and dissolved cyclodextrin may be simultaneously destroyed using one or more oxidants. For example, the concentration of the contaminant, the contaminant/cyclodextrin complex and the free cyclodextrin may each be reduced by more than 50%, more than 75% or more than 90% by weight.

In another embodiment a cyclic oligosaccharide may be selected to form a clathrate having properties that cause it to reside in a particular portion of the soil or water column. For instance, if the target contaminant is a dense compound the combination of the cyclic oligosaccharide and activator or oxidant are chosen to produce a clathrate denser than water so that the clathrate will concentrate in the vicinity of the contaminant. This can allow for maximization of contact of the contaminant with the oxidant or activator while reducing the use of oxidant that never comes into contact with the target contaminant. The cyclic oligosaccharide can form a clathrate with an activator and both the resulting clathrate and oxidant can be chosen to be of greater, lesser or equal density to water. For instance, if the clathrate density is greater than 1.0 it will tend to sink within the soil and groundwater media. When treating DNAPL, for instance, this denser clathrate will serve to concentrate active components, such as oligosaccharide, oxidant and/or activator in the lower portion of the saturated zone close to, or in contact with, the DNAPL. Very little, if any, of these compounds will be wasted in areas above the DNAPL that contain little or no contamination.

Experiment 1A

An experiment was conducted to determine how the stability of an aqueous ozone solution compares to the stability of an aqueous solution of a clathrate comprising ozone and hydroxypropyl-β-cyclodextrin. A first bubble column contained DI water. A second column contained a 20 mM (26.2 g/L) solution of hydroxypropyl-β-cyclodextrin in DI water. Each column was ozonated for approximately 10 minutes. After ozonation, each column was analyzed for ozone (Analytical Technologies Inc. Model #Q45H/64) and ORP (Orion Model #920A ion specific electrode). Readings were taken each minute for the first 15 minutes and every 5 minutes thereafter until ozone concentrations were seen to level off to background levels. Results are provided below in Table 1 (NA=Not Analyzed) and indicate the maintenance of a much higher free ozone concentration in the clathrate solution (about 2 ppm) than in the pure ozone solution (<1 ppm). For example, as seen in FIG. 1, even after two hours the ozone concentration in the clathrate solution (pH 6.8) was stable at about 2 ppm while the ozone concentration in the pure ozone solution dropped below 2 ppm in about 20 minutes and below about 1 ppm in an hour. The clathrate provided for a more consistent level of ozone throughout the two hour time window while the sample without the clathrate exhibited very high initial concentrations that tailed off more quickly when compared to the clathrate sample.

TABLE 1

| Time (min) | O₃ Concentration (mg/L) | |
|---|---|---|
| | $O_3$ | $O_3$ + CD |
| 0 | 9 | 9 |
| 1 | 8.6 | 3 |
| 2 | 7 | 3.5 |
| 3 | 6.4 | 2.6 |
| 4 | 6 | 2.5 |
| 5 | 5 | 3.5 |
| 6 | 4.4 | 1.8 |
| 7 | 3.5 | 1.9 |
| 8 | 3.2 | 2.8 |
| 9 | 3 | 2.3 |
| 10 | 2.7 | 2.6 |
| 11 | 2.5 | 2.8 |
| 12 | 2.3 | 2.9 |
| 13 | 2.2 | 4.7 |
| 14 | 2.1 | 2.7 |
| 15 | 2 | 2.4 |
| 20 | 1.7 | 2.6 |
| 25 | 1.5 | 2.5 |
| 30 | 1.4 | 4.7 |
| 35 | 1.3 | 1.9 |
| 40 | 1.2 | 2.3 |
| 45 | 1 | 2.7 |
| 50 | 1 | 2.3 |
| 55 | 1 | 2 |
| 60 | 1 | 2.2 |
| 65 | 1 | 2.3 |
| 70 | 1 | 2.5 |
| 75 | NA | 2 |
| 80 | NA | 1.9 |
| 85 | NA | 2.3 |
| 90 | NA | 2.1 |
| 95 | NA | 2.1 |
| 100 | NA | 2.6 |
| 105 | NA | 2.5 |
| 110 | NA | 2.2 |
| 115 | NA | 2.4 |
| 120 | NA | 2.1 |
| 960 | NA | 2.1 |

Experiment 1B

Experiment 1B was performed to provide confirmation of the experiment 1A results using a different analytical method for ozone analysis based on titration. The experiment, methods, and findings are discussed here.

The experiment illustrates that the presence of cyclodextrin can affect and stabilize the dissolved ozone concentration in an aqueous system. In one test, the apparent half life (by probe) of ozone in a 0.5% cyclodextrin solution was reduced from around 13 minutes to about 1 minute. This means the formed ozone clathrate sequesters the ozone and renders it undetectable by the probe. To determine the dissolved ozone concentrations below the detection limit of the probe (0.1 mg/l), the Indigo Colorimetric Method (Standard Methods) was used. In this method, free ozone destroys the blue indigo color. The grade of decoloration can be measured spectrophotometrically to quantify the ozone concentration. The change in color is instantaneous.

Figure 5:
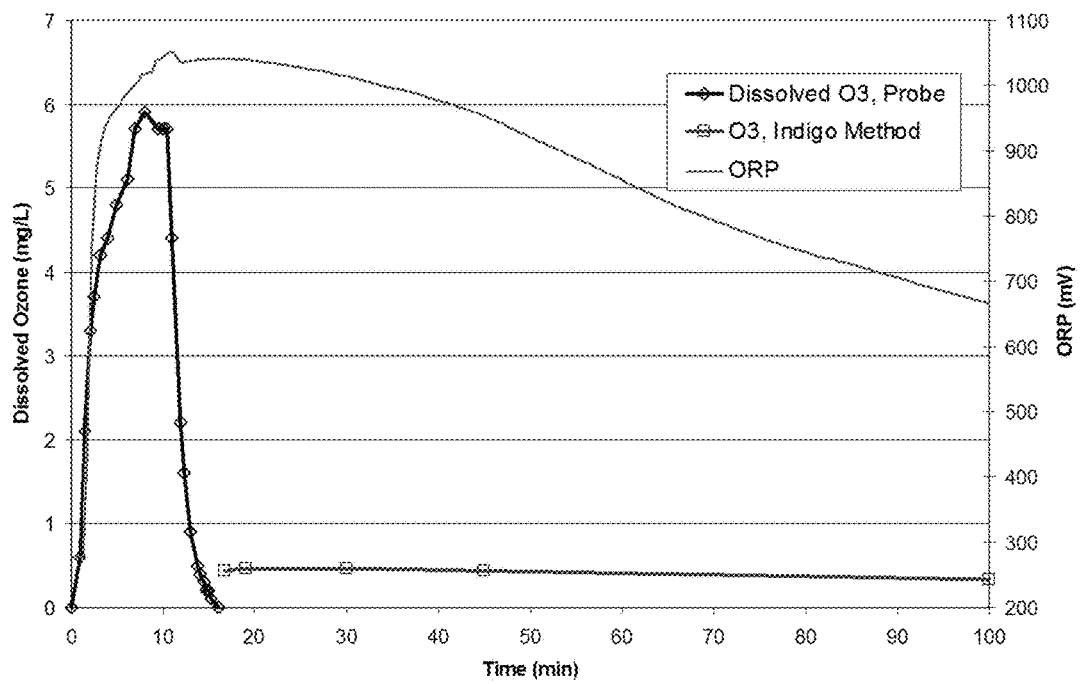
FIG. 5 is a graph showing experimental results of change of dissolved ozone concentration over time.
Figure 6:
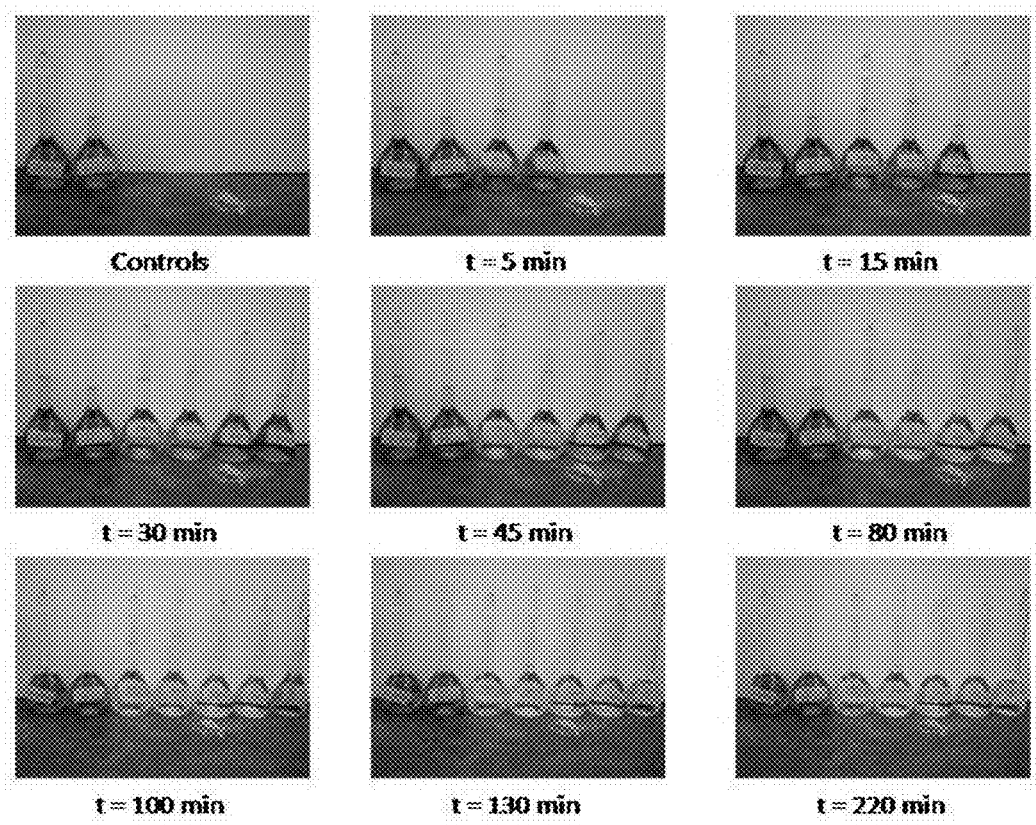
FIG. 6 is a copy of a photograph depicting the visual results of an indigo colorimetric ozone test.

In another test, indigo solution was combined with a cyclodextrin-stabilized ozone solution, the solution did not decolorize instantaneously. It took 80 minutes for the solution to decolorize completely. This indicates that over the course of 80 minutes the equivalent of 0.5 mg/l (the upper detection limit for this method) dissolved ozone was released from the cyclodextrin/ozone clathrate to the aqueous phase to react with the indigo. FIG. 6 displays this phenomenon in a time-series of pictures taken over 80 min. The initial picture was taken when the dissolved ozone probe read 0.0 mg/l (ND). The samples in each picture are, from left to right, a deionized water control, a CD control, t=0 min, t=5 min, t=15 min, t=30, t=45 min, t=80 min, t=100 min, t=130 min and t=220 min. The results show that even the sample drawn 80 minutes after no dissolved ozone could be detected by the probe contained at least 0.5 mg/l of cyclodextrin-complexed ozone when tested using the Indigo Colorimetric Method. FIG. 5 shows these results analytically, i.e. based on the continuously metered ORP values. The fact that the ORP was still greater than 1,000 mV after 15 min when the ozone probe failed to detect any free ozone and greater than 600 mV after 100 minutes shows the continued activity of ozone in solution.

These results mean that cyclodextrin may be used to prolong the activity of aqueous ozone, thereby increasing the oxidant's reaction time and effectiveness. This is especially beneficial for in-situ applications when the goal is to deliver ozone deep into the contaminated soil formation.

Experiment 1B verified the results of experiment 1A that the cyclic oligosaccharide (HP-β-CD) does form a clathrate and that the clathrate slowly releases ozone into solution as determined visually and spectrophotometrically.

Experiment 2

A second experiment was conducted to determine what negative interaction may exist, if any, between oxidants and hydroxypropyl-β-cyclodextrin in the presence of trichloroethylene (TCE) at a concentration exceeding the solubility limit of TCE in water. Eight samples were developed to analyze remedial efficiencies of the persulfate/ozone/hydrogen peroxide system described in U.S. Patent Application Publication No. 2008/0008535A1. The experiment was run with and without the presence of HP-β3-CD. The reactor composition was as follows:

1) TCE & Phosphate Buffer
2) TCE, HP-β-CD & Phosphate Buffer
3) TCE, Ozone & Phosphate Buffer
4) TCE, Ozone, HP-β-CD & Phosphate Buffer
5) TCE, OxyZone & Phosphate Buffer
6) TCE, OxyZone, HP-β-CD & Phosphate Buffer
7) TCE, Oxygen & Phosphate Buffer
8) TCE, Oxygen, HP-β-CD & Phosphate Buffer Reactors were 1000 ml HDPE bottles, and were secured on a LABLINE Multi-Magnestir magnetic stirrer and were stirred for 26 hours at 20° C. Samples were taken from the reactors using a peristaltic pump and were stored in 43 ml VOAs. Samples were taken at 0, 1.75, 6, and 26 hours. The concentrations of the compounds in the reactors were as follows:
$Na_2S_2O_8$=65 g/L
$H_2O_2$=125 mg/L
HP-β-CD=5 g/L
TCE=2000 mg/L
Buffer=3.44 g/L Monobasic Potassium Phosphate
    4.54 g/L Dibasic Potassium Phosphate Reactors treated with gas received 50 mL/min of either pure oxygen gas or 6% ozone gas by weight. This is equivalent to approximately 3.2 mg/min of ozone in the reactors treated with ozone (Reactors 3-6).

Figure 2:
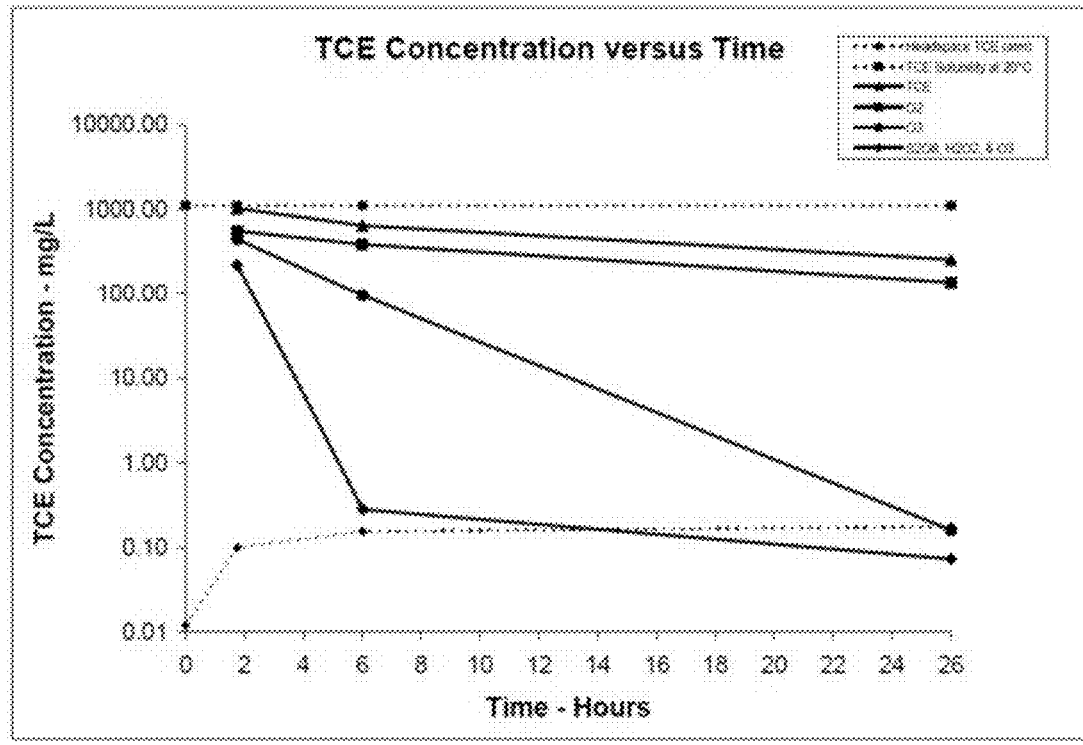
FIG. 2 is a graph showing experimental results of trichloroethene concentration versus time.
Figure 3:
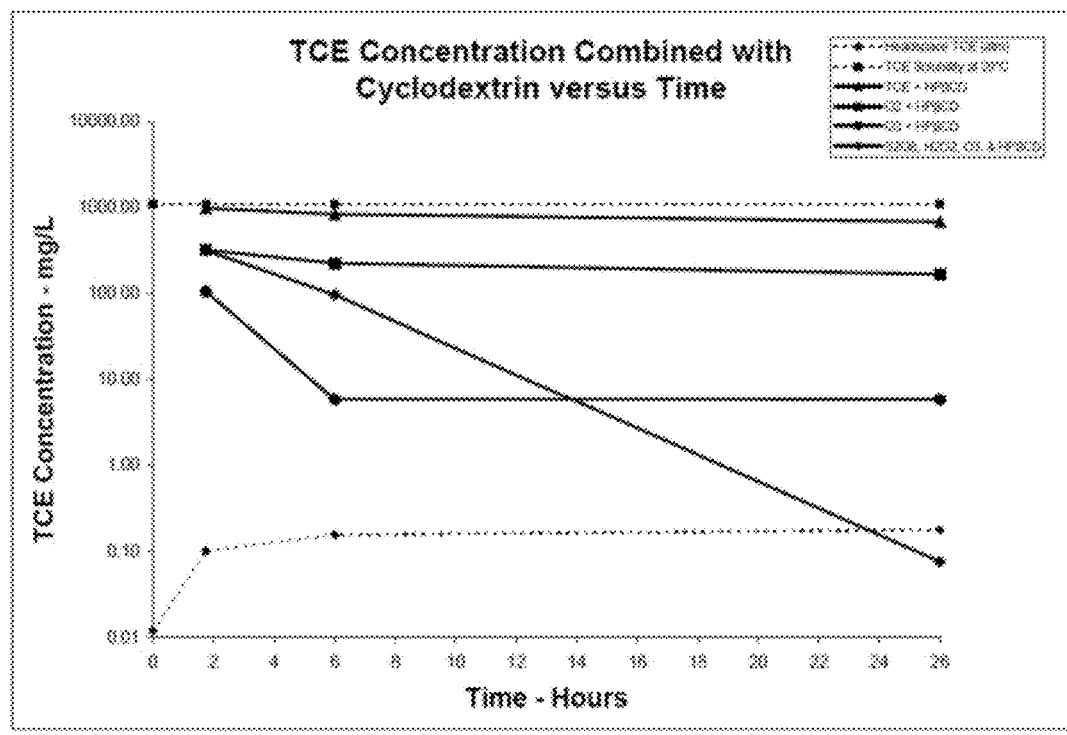
FIG. 3 is a graph showing experimental results of trichloroethene concentration versus time in the presence of cyclodextrin.

Results are provided below in Table 2 (and graphically in FIGS. 2 and 3) and indicate that persulfate/ozone/hydrogen peroxide and HP-β-CD do not interact in a negative manner. The presence of HP-β-CD decreased the oxidation rate, as the TCE concentration for persulfate/ozone/hydrogen peroxide alone at 6 hours was 283 ppb, while for persulfate/ozone/hydrogen peroxide with HP-β-CD the TCE concentration at 6 hours was 96.9 ppm. However, the TCE concentration at 26 hours without HP-β-CD with HP-β-CD were 73.5 ppb and 75.5 ppb, respectively. If HP-β-CD was generating oxidant demand, the HP-β-CD sample would not reach the same TCE destruction levels as the sample without the HP-β3-CD.

The results also demonstrate a significant reduction in the oxidation rate and efficiency of ozone alone when HP-β-CD is in solution, potentially by the HP-β-CD inhibiting contact between ozone and TCE trapped within the HP-β-CD cavity. Additionally, the results show that the presence of HP-β-CD inhibits TCE volatilization. This is demonstrated by the retention of TCE in the control sample containing HP-β-CD (sample 2) relative to the control sample without HP-β-CD (sample 1). This second point is further evidence for uptake of TCE into the HP-β-CD cavity. Therefore, the cyclic oligosaccharide (HP-β-CD) stabilized the ozone in solution, decreased the contaminant losses due to volatilization and did not adversely affect the oxidation capacity of the system which included ozone, persulfate and hydrogen peroxide.

TABLE 2

|  | TCE Concentration (mg/L) Time (hrs) | | |
| --- | --- | --- | --- |
| Sample | 1.75 | 6 | 26 |
| TCE | 1030 | 644 | 256 |
| TCE + CD | 984 | 837 | 685 |
| TCE + $O_3$ | 444 | 96 | 0.162 |
| TCE + $O_3$ + CD | 106 | 5.86 | 5.83 |
| TCE + $S_2O_8$ + $H_2O_2$ + $O_3$ | 220 | 0.283 | 0.0735 |
| TCE + $S_2O_8$ + $H_2O_2$ + $O_3$ + CD | 316 | 96.9 | 0.0755 |
| TCE + $O_2$ | 555 | 386 | 137 |
| TCE + $O_2$ + CD | 321 | 226 | 168 |

Experiment 3

Another experiment was conducted to evaluate the effect of an ozone clathrate on the potential for enhanced desorption and degradation of strongly sorbed organic contaminants such as polycycylic aromatic hydrocarbons (PAHs). Pyrene was used as the target compound to be representative of PAHs sorbed onto soil in a soil and groundwater matrix. Pyrene was solubilized in methanol and the solution was mixed with the sand thoroughly. The methanol was subsequently evaporated under a fume hood leaving the pyrene adsorbed onto the sand. The sand/pyrene material was allowed to sit for three days prior to analysis for pyrene concentration and its use in the experiments. Eight samples were developed to analyze remedial efficiencies of sodium persulfate, hydrogen peroxide, and ozone with and without the presence of HP-β3-CD. The reactor composition was as follows:
  9) Pyrene Sand & Deionized Water
  10) Pyrene Sand, Oxygen & Deionized Water
  11) Pyrene Sand, Ozone & Deionized Water
  12) Pyrene Sand, HP-β-CD & Deionized Water
  13) Pyrene Sand, Oxygen, HP-β-CD & Deionized Water
  14) Pyrene Sand, Ozone HP-β-CD & Deionized Water Semi-batch reactors were 1200 ml borosilicate glass columns for 24 hours at 20° C. fitted with inlet and outlet for ozone or oxygen gas and off-gas. One pore volume (600 mL) of deionized water was added to each column. After the reaction period, sand samples were taken from the center of the columns and stored in 8 oz amber glass jars. The initial concentrations of the compounds in the reactors were as follows:
HP-β-CD=5 g/L
Pyrene=500 mg/kg Reactors treated with gas received 50 mL/min of either pure oxygen gas or 6% ozone gas in oxygen gas by weight. This is equivalent to approximately 3.2 mg/min of ozone in the reactors treated with ozone (Reactors 2-3, 5-6).

Figure 4:
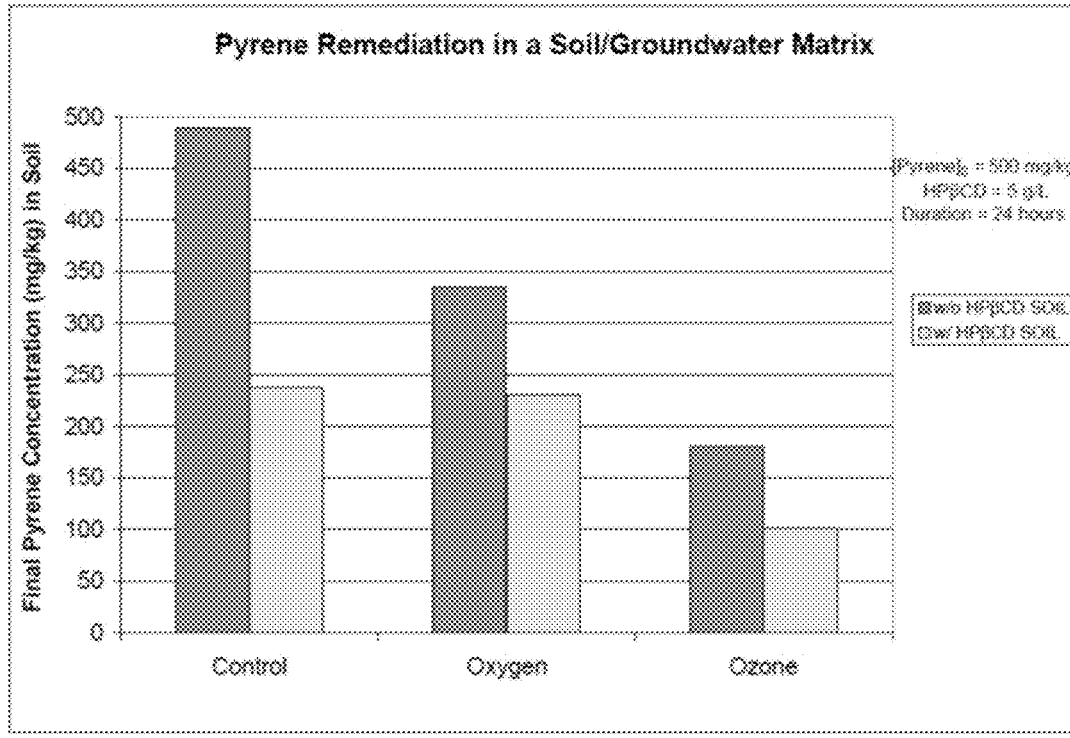
FIG. 4 is a graph showing experimental results of pyrene remediation in a soil/groundwater matrix.

Sand samples were analyzed by GC/MS using EPA Method 8270 for PAHs. Results are provided below in Table 3 (and in FIG. 4) and indicate that the Ozone/HP-β-CD clathrate provides the greatest reduction in pyrene concentration in soil, from an initial concentration of approximately 500 ppm to 101 ppm. The presence of HP-β-CD alone decreased the concentration of pyrene in sand to 238 ppm, indicating a significant desorption effect relative to deionized water alone, which resulted in a pyrene concentration of 490 ppm.

TABLE 3

| Sample | Pyrene Concentration (mg/kg) |
| --- | --- |
| Pyrene | 490 |
| Pyrene + CD | 238 |
| Pyrene + $O_2$ | 335 |
| Pyrene + $O_2$ + CD | 231 |
| Pyrene + $O_3$ | 180 |
| Pyrene + $O_3$ + CD | 101 |

It is to be understood that this disclosure is not limited in its application to the details of construction and the arrangement of components set forth in the following description or illustrated in the drawings. The embodiments herein are capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

The foregoing description of several methods and embodiments has been presented for purposes of illustration. It is not intended to be exhaustive or to limit the claims to the precise steps and/or forms disclosed, and obviously many modifications and variations are possible in light of the above teaching. It is intended that the scope of the invention be defined by the claims appended hereto.

What is claimed is:

1. A method of reducing the concentration of perfluoroalkyl compounds in a contaminated material, the method comprising:
   desorbing at least one of the perfluoroalkyl compounds from the contaminated material;
   forming a soluble cyclic oligosaccharide/perfluoroalkyl complex with the at least one perfluoroalkyl compound in an aqueous phase; and
   destroying the cyclic oligosaccharide/perfluoroalkyl complex in the aqueous phase, wherein a concentration of the at least one perfluoroalkyl compound in the contaminated material is reduced by greater than 50% of an original concentration, and the concentration of the at least one perfluoroalkyl compound is reduced to less than 1.0 ppm in the contaminated material, wherein the contaminated material comprises at least one of soil, sediment and rock.

2. The method of claim 1, wherein the cyclic oligosaccharide/perfluoroalkyl complex is destroyed in situ.

3. The method of claim 1, wherein the cyclic oligosaccharide/perfluoroalkyl complex is destroyed ex situ.

4. The method of claim 1, wherein the cyclic oligosaccharide and the perfluoroalkyl compounds are oxidized by at least one of persulfate, ozone, oxygen, and peroxide in situ.

5. The method of claim 1, wherein the cyclic oligosaccharide and the perfluoroalkyl compounds are oxidized by at least one of persulfate, ozone, oxygen, and peroxide ex situ.

6. The method of claim 1 comprising sparging at least one of ozone, oxygen, air, and nitrogen in the aqueous phase.

7. The method of claim 1 comprising adding at least one of persulfate, ozone, hydrogen peroxide, oxygen, air, nitrogen and a salt.

8. The method of claim 1 comprising adding at least two of persulfate, ozone, hydrogen peroxide, oxygen, air, nitrogen and a salt.

9. The method of claim 1 comprising adding at least three of persulfate, ozone, hydrogen peroxide, oxygen, air, nitrogen and a salt.

10. The method of claim 1 comprising adding at least four of persulfate, ozone, hydrogen peroxide, oxygen, air, nitrogen and a salt.

11. The method of claim 1 comprising adding at least five of persulfate, ozone, hydrogen peroxide, oxygen, air, nitrogen and a salt.

12. The method of claim 1 comprising adding at least six of persulfate, ozone, hydrogen peroxide, oxygen, air, nitrogen and a salt.

13. The method of claim 1 comprising passing bubbles in the aqueous phase.

14. The method of claim 13, wherein the bubbles comprise ozone.

15. The method of claim 1, wherein any dissolved cyclic oligosaccharides, dissolved perfluoroalkyl compounds, and solubilized cyclic oligosaccharide/perfluoroalkyl complex are simultaneously destroyed using at least one of persulfate, ozone, oxygen, and peroxide.

16. The method of claim 1, wherein the cyclic oligosaccharide comprises at least one of alpha-cyclodextrin or a derivative thereof; beta-cyclodextrin or a derivative thereof; and gamma-cyclodextrin or a derivative thereof.

17. The method of claim 1, wherein the cyclic oligosaccharide comprises a hydroxypropyl beta cyclodextrin.

18. The method of claim 1, wherein the cyclic oligosaccharide is in a concentration range of greater than 10 mg/L.

19. The method of claim 1 comprising introducing at least one of an activator, a catalyst, a complexing agent, a surfactant, and a co-solvent to the aqueous phase.

20. The method of claim 1, wherein the contaminated material is in a saturated zone.

* * * * *